Sept. 24, 1963 A. V. JAFFE 3,104,816
DISPENSER HAVING END POINT INDICATING MEANS
Filed Oct. 27, 1959
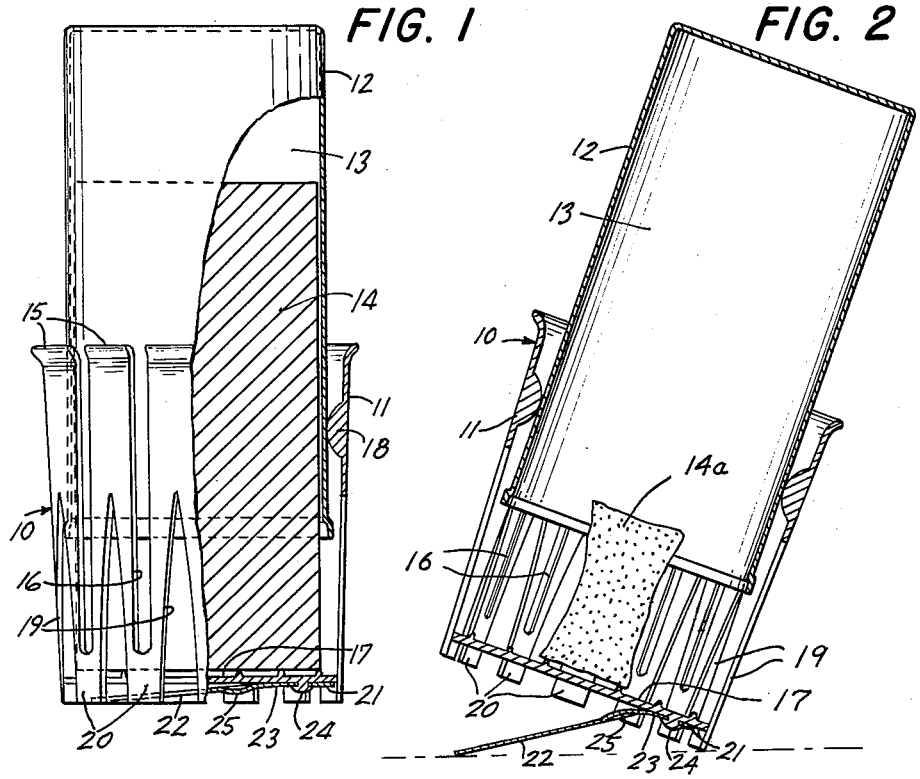
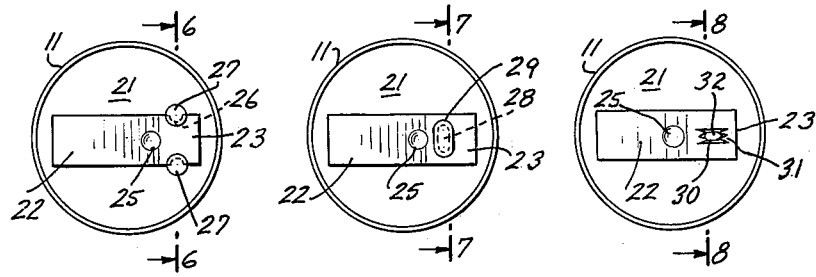
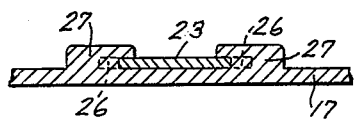
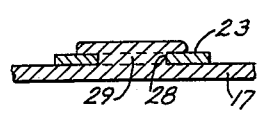
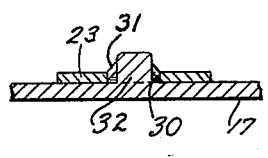
INVENTOR.
ARNOLD V. JAFFE
BY
ATTORNEY 3,104,816
DISPENSER HAVING END POINT INDICATING MEANS
Arnold V. Jaffe, Brooklyn, N.Y., assignor to Airkem, Inc., New York, N.Y., a corporation of New York
Filed Oct. 27, 1959, Ser. No. 849,104
3 Claims. (Cl. 239—35)

This invention relates to dispensing devices for consumable material having end-point indicating means providing a signal as to when the contents thereof have been substantially consumed. More particularly, the invention relates to dispensers of the type described, adapted to normally stand upright on a horizontal surface wherein the end-point indicating means imparts to the device, a noticeably inclined position with respect to the supporting surface.

In various types of dispensers for consumable material, it is desirable to provide the user with some means for noticing when the material therein has been substantially consumed. This is particularly true with dispensers for air treating and odor control compositions which are consumed through the emission of volatilizable material whereby it is impossible to ascertain from the exterior of the device, the extent to which the contents have been consumed. The problem is particularly significant with air treating agents in gel form of the type disclosed and claimed in United States Patent No. 2,691,615, since with such air treating gels, which undergo shrinkage and contraction as the volatilizable materials are discharged therefrom, it is difficult for the average user to accurately determine the end-point of useful operation even when examining the contents of a dispenser. This is in part due to the fact that some volatilizable materials remaining in the contracted or spent gel mass impart to it an odor which the inexperienced user can mistake for an indication of further useful life, whereas in fact, active evaporation of volatile components may have ceased.

A practical and attractive type of dispenser for air treating gel has been disclosed and claimed in United States Patent No. 2,878,060, and for purpose of illustrating a preferred adaptation of the present invention, the same will be described and illustrated in connection with a dispenser of the type disclosed in said patent.

Regarded in certain of its broader aspects, the end-point indicating means for dispensing devices in accordance with the present invention, comprises deflectable means secured to the bottom wall of a dispenser embodying a pretensioned leaf spring with the pretensioning in said spring being such as to normally dispose a portion of the spring in protruding relation with respect to said bottom wall, and to permit said spring, when a force W is applied thereto, to be disposed in alignment with said bottom wall, the force W being equated to the force applied by the weight of the dispenser plus a minimal useful weight of consumable material in the dispenser. It is evident that the weight of the dispenser and a fresh charge of consumable material will greatly exceed the critical force W above mentioned so that the device, when standing on a horizontal surface, will hold the spring member in alignment with the bottom wall of the device, permitting the same to stand in the normal upright position on said surface. When consumption of the contents, as for example evaporation of the gel, has progressed beyond a predetermined extent, so that the critical force W is no longer applied, the spring will suddenly flex outwardly from the bottom wall of the device to impart a tilted or inclined position to the device with respect to the horizontal support on which it is resting. This malpositioning of the device provides a positive indication to the user that the contents have been spent, and that the device should be recharged with the consumable material.

The present invention will be readily understood from a consideration of the following description, taken together with the accompanying drawing, in which preferred adaptations of the invention are clearly illustrated in the several views with the various parts thereof identified by suitable reference characters in each of the views, and in which:

FIG. 1 is a side elevation view of a dispenser for air treating gel with part of the structure broken away and in section to show the presence of a fresh charge of gel and to show the end-point indicating means in inoperative position;

FIG. 2 is a sectional view similar to FIG. 1, showing a body of spent air treating gel, and further showing the end-point indicating means in operative position;

FIGS. 3, 4 and 5 are bottom plan views of the device as shown in FIGS. 1 and 2, illustrating preferred means for securing end-point indicating means to the device; and FIGS. 6, 7 and 8 are partial sectional views on the lines 6—6, 7—7 and 8—8 respectively of FIGS. 3, 4 and 5.

As shown in FIGS. 1 and 2 of the drawing, a dispensing device 10 for air treating gel closely corresponds in general appearance with that disclosed in United States Patent No. 2,878,060 and comprises a base part 11 and a closure part 12 telescopically interfitting therewith to provide a storage chamber 13 for a cylindrical body 14 of air treating gel. The body of gel 14, when fresh, preferably substantially fills the chamber 13 when the closure 12 is telescopically lowered against the base.

The base part 11 is provided with circumferentially spaced spring members 15 separated by elongated slits 16 extending to a point slightly above the bottom wall 17 of the base part. The spring members 15 are each provided with inwardly protruding knobs 18 near the free end thereof for engagement with the outer cylindrical walls of the closure part 12. The spring members are also provided with apertures 19 extending from a point slightly above the center of the base part 11 to and past the bottom wall 17 whereby portions of the base part 11 between successive apertures 19 extend beyond the bottom wall 17 to provide a series of circumferential legs 20 defining a shallow recess 21 below said bottom wall.

It will be apparent that the apertures 19 and portions of the slots 16 provide openings in the side wall of the base which, when the closure 12 is elevated, permit circulation of air through the device and emission of volatilizable material therefrom. With such emission of volatilizable material, the air treating gel 14 will gradually shrink to a residual mass 14a as shown in FIG. 2 of the drawing from which volatilizable materials have been substantially exhausted, and the weight of which is only a small fraction of the weight of the original gel mass 14.

Within the recess 21 there is mounted an elongtaed leaf spring 22 having a short mounting end 23 and having means as indicated at 24 for positioning the same adjacent one edge of the bottom wall 17 with the free end of said spring extending substantially to the opposite side of said bottom wall.

The spring 22 is shown in its normal position in FIG. 2 of the drawing with a prestressed dimple or offset 25 adjacent the mounting end 23 and with the free end of the spring 22 disposed at an acute angle to the bottom wall 17 as indicated. When a sufficient force is applied to the free end of the spring 22, this will suddenly overcome the prestressing, and the offset 25 shown at the upper side of the spring 22 in FIG. 2, is displaced to the lower side as shown in FIG. 1, while the spring 22 is permitted to collapse in substantial alignment with the bottom wall 17. This type of snap-spring principle is utilized in conventional noise-making devices, such as toy crickets and toy pistols, as well as in other types of devices where sudden change in contour is desired in response to variation of externally applied force.

As employed in the present invention, it is to be understood that prestressing of the spring 22, and the size and shape thereof, will be adapted to the overall weight of the dispenser and contents, so that as long as the combined weight includes a useful amount of volatilizable material in the gel, this weight will support the spring 22 in the collapsed position as shown in FIG. 1. When the combined weight, however, falls below a predetermined amount provided when the spent gel slug 14a has lost substantially all of its volatilizable material, the spring 22 will snap to the position shown in FIG. 2 of the drawing, causing the tilting orientation of the device, and thereby providing an unmistakable signal or indication that recharging of the device is necessary.

The spring 22 can be secured to the bottom wall 17 and within the recess 21 in various ways, and the showings in FIGS. 3 to 8 of the drawing will serve to illustrate preferred ways of attaching the spring to the device. In FIGS. 3 and 6, the spring 22 has been provided with edge notches 26 registering with protruding parts 27 integral with the bottom wall 17 and overlying the mounting end 23 of the spring is provided with an elongated therewith. Suitably, the protruding portions 27 can constitute integrally molded parts of the bottom wall 17 which are then reformed or deformed to overlie the surface of the spring.

In FIGS. 4 and 7 the positioning and orientation of the spring 22 is effected by providing an elongated aperture 28 in the mounting end 23 of the spring which is engaged by an elongated protruding part 29 integral with the bottom wall 17 and overlying the surface of the spring to retain the same in position.

In FIGS. 5 and 8 there is shown an alternative type of mounting means for the spring 22 wherein the mounting end 23 of the spring is provided with an elongated cutout 30 extending longitudinally of the spring and having upwardly offset pronged ends 31 for slidable mounting and locking engagement with an elongated stud 32 integral with the bottom wall 17. With this type of mounting, it will be evident that the upwardly deflected prongs 31 which closely engage the stud 32 will slide over the stud in the downward or mounting movement of the spring, but will strongly resist subsequent efforts to elevate or remove the spring.

It will be understood that while several suitable means for attaching the spring 22 to the device have been shown and described, any suitable mounting can be employed which will positively position the spring 22 with respect to the bottom wall 17 without interfering with the functioning of the prestressed portion 25.

It will also be understood that while the principles and construction of the device have been described with particular reference to a dispenser for air treating gel, the present invention is applicable to any dispenser for consumable material which is normally intended to stand on a horizontal surface, and in which the state of exhaustion of the consumable material is difficult to ascertain from the exterior of the device.

Various changes and modifications in the invention as herein disclosed will occur to those skilled in the art, and to the extent that such changes and modifications are embraced by the appended claims, it is to be understood that they constitute part of my invention.

I claim:

1. In a dispensing container for air treating gel which undergoes characteristic shrinkage due to evaporation of volatilizable materials therefrom, a base part for said container having an essentially flat bottom wall with peripheral downwardly protruding means defining a shallow recess and having end point indicating means associated therewith for visibly and audibly signaling when the useful life of the gel has been exceeded, said end point indicating means comprising a spring member having an angularly offset end fixedly disposed against said flat bottom wall, said spring member being pretensioned adjacent the offset end thereof to normally dispose the other free end thereof in a position protruding downwardly from said recess, but to be deflected to an orientation within said recess by the combined weight of said container and a useful quantity of air treating gel, and the pretensioning of said spring member being further characterized as providing sudden snap movement thereof to the outwardly protruding position, inclining said container with respect to a horizontal supporting surface, when the combined weight of the container and residual air treating gel falls to the predetermined amount at which the air treating gel has been spent.

2. A dispensing container and associated end point indicating means as defined in claim 1 wherein the angularly offset end of said spring member is secured to the bottom wall of said container by cutout portions of said end engaged by integral protruding means on said bottom wall which overlie adjacent outer surfaces of said offset end.

3. A dispensing container and associated end point indicating means as defined in claim 1 wherein the angularly offset end of said spring member is provided with an elongated central aperture having opposed peripheral portions displaced from the surface thereof for slidable locking engagement with a protruding member on the bottom wall of said container.

References Cited in the file of this patent

UNITED STATES PATENTS

| | | |
|---|---|---|
| 188,875 | Durand | Mar. 27, 1877 |
| 2,707,930 | Miles | May 10, 1955 |
| 2,878,060 | Russo | Mar. 17, 1959 |